United States Patent [19]

Lopez, Jr.

[11] Patent Number: 4,571,966
[45] Date of Patent: Feb. 25, 1986

[54] SECURITY MECHANISM FOR PIPE FLANGES

[76] Inventor: John D. Lopez, Jr., Rte. 3 Box 204, Carthage, Tex. 75633

[21] Appl. No.: 483,727

[22] Filed: Apr. 11, 1983

[51] Int. Cl.$^4$ ............................................. F16B 41/00
[52] U.S. Cl. ....................................................... 70/232
[58] Field of Search ........................ 70/32, 33, 34, 229, 70/230, 231, 232; 285/80, 81, 91, 39; 411/402, 403, 405, 427, 910, 368

[56] References Cited

U.S. PATENT DOCUMENTS

| | | | |
|---|---|---|---|
| 3,519,979 | 7/1970 | Bodenstein | 411/910 |
| 3,785,670 | 1/1974 | Smith | 411/403 |
| 4,253,509 | 3/1981 | Collet | 411/910 |
| 4,358,941 | 11/1982 | Zimmer | 70/229 |
| 4,428,211 | 1/1984 | Hermann | 70/34 |
| 4,480,513 | 11/1984 | McCauley | 411/403 |

Primary Examiner—Robert L. Wolfe
Attorney, Agent, or Firm—Gunn, Lee & Jackson

[57] ABSTRACT

This locking mechanism incorporates mechanical objects such as pipe flanges having locking receptacles through which extend a retaining pin having a retaining sleeve threadedly received thereby and secured by means of a locking ring. Both the retaining pin and retaining sleeve can be installed and removed only by means of specifically designed installation tools. A locking plug is also received within one of the flange receptacles and is secured by a plug retainer pin. The locking plug can be installed and removed only be means of a removal key which is retained by authorized personnel. Sealing plugs secure the retaining pin and plug retainer pin in encapsulated position within the pipe flanges and thereby prevent tampering.

17 Claims, 4 Drawing Figures

SECURITY MECHANISM FOR PIPE FLANGES

FIELD OF THE INVENTION

This invention relates generally to locking mechanisms for securing mechanical objects in assembly and prevents unauthorized separation thereof. More specifically, the invention concerns locking mechanisms for the pipe flanges of fluid handling pipelines and more specifically concerns a flange locking mechanism having the capability of retaining pipe flanges in secured assembly and preventing disassembly or tampering with the flanged pipe joints by unauthorized personnel.

BACKGROUND OF THE INVENTION

To facilitate ready understanding of this invention, it is discussed herein particularly as it relates to locking mechanisms for pipe flanges. It should be borne in mind, however, that this locking mechanism may be provided for securing other mechanical objects as well.

Many pipelines are assembled by interconnecting sections of pipe by means of bolted flanges. Flanged pipe sections typically incorporate pipe flanges which are welded at each end of pipe sections of desirable length. Assembly of the flanged pipe sections is accomplished by means of bolts or studs which extend through registering bolt or stud openings formed in the flanges. The bolts or studs are extended through the aligned openings of the flanges and nuts are assembled to the threads of the bolts or studs and are rotated to draw the flanges into sealed assembly. Typically, pipe flanges are also formed to define circular seal grooves which receive a ring gasket between the flanges to thus establish a seal between them. Typically the bolts or studs are tightenend sufficiently to bring the flanges into sealed assembly with the ring gasket, leaving a certain amount of standoff between the flanges.

In many cases, assembled flow lines control the flow of liquid or gaseous materials that are potentially harmful. In such case, it is extremely important that service personnel or unauthorized persons be incapable of inadvertently disassembling a bolted pipe flange unless the flow line is rendered safe. It is desirable, therefore, to ensure that certain flanged flow lines not be capable of unauthorized disassembly so that workers may be protected from the hazards of potentially harmful fluids. By ensuring that the flanges of the pipeline are locked in assembly and by providing only authorized personnel with tools to unlock the flanges, it may be reasonably assured that the pipeline is capable of disassembly only by authorized personnel.

In many cases, flanged pipelines are utilized for transporting valuable liquid and gaseous materials. Theft of these materials can be accomplished quite easily if a flanged flow line is disassembled by unauthorized personnel. It is also desirable, therefore, to provide means for ensuring that pipelines remain locked in assembly to prevent theft or unauthorized release of the constituents transported by the pipeline.

SUMMARY OF THE INVENTION

It is therefore a primary feature of the present invention to provide a novel flange locking mechanism for flanged pipelines wherein locking means secures the flanges in positive assembly such that the flanges cannot be separated without the use of a key and specific disassembly tools which are maintained only by authorized personnel.

It is another feature of this invention to provide a novel flange locking mechanism wherein few of the components thereof are exposed to view, thus minimizing tampering by unauthorized personnel.

It is an even further feature of this invention to provide a novel flange locking mechanism having a retaining strength equalling that of convention bolts or studs to thereby prevent stress or leakage of pipe flanges.

It is another feature of this invention to provide a novel flange lockihg mechanism incorporating retaining means which may be installed and removed only through the use of specially designed tools, thus minimizing disassembly of the flanges by unauthorized personnel.

It is an even further feature of this invention to provide a novel flange locking mechanism incorporating seal plugs which are driven into respective bores and which are capable of surface preparation so as to minimize detection of the locking mechanism by unauthorized personnel.

Among the several features of this invention is contemplated the provision of a novel flange locking mechanism incorporating a locking ring which provides further assurance of flange disassembly only by authorized personnel.

It is also a feature of this invention to provide a novel flange locking mechanism wherein the major components thereof are formed of a material that is difficult to cut by means of a cutting torch or metal cutting saw.

It is an even further feature of this invention to provide a novel flange locking mechanism which may be provided with specific characteristics of an owner, thereby rendering it incapable of being interchanged without authorization from one owner company to another.

It is also a feature of this invention to provide a novel flange locking mechanism which may be removed only when the flanges are retained in assembly by means of conventional flange bolts or studs, thereby providing a deterrent to disassembly of the flanges by unknowledgeable personnel.

It is also a feature of this invention to provide a novel flange locking mechanism which provides means for tracing and registration for identification and recovery in the event flow line equipment is stolen or otherwise misappropriated.

Briefly, the present invention is accomplished by providing pipe flanges having conventional registering bolt holes formed therein and also having one or more lock receiving receptacles. For each lock, a retaining pin is extended through the locking receptacle in one of the flanges and is prevented from rotating in the receptacle by means of a special tool of proprietary design. A retaining sleeve is threadedly received by the threaded portion of the retaining pin which is positioned within the opposite locking receptacle. A locking ring in the form of a snap ring is received within a locking ring groove formed in the free extremity of the retaining pin. In order to gain access to the locking ring to permit its removal and to also permit removal of the retaining sleeve, a locking plug is removably positioned within the second locking receptacle and is retained therein by means of a plug retainer pin which is positioned through a retainer pin opening oriented transversely to the axis of the locking receptacle. A removal key which is specifically designed to be received within a key way of the locking plug is capable of being inserted into the locking plug and forcing the plug retainer pin outwardly to release the locking plug for removal. After removal of the locking plug, the locking ring may be removed, thus permitting the retaining sleeve to be unthreaded from the threaded extremity of the retainer pin. The retaining sleeve is specifically designed for installation and removal only through means of a specially designed tool therefor. The installation and removal tools for the retaining pin and retaining sleeve, together with the specifically designed removal key provide authorized personnel with means for easily assembling and disassembling the flanged joints of the flow line. Unauthorized personnel, however, not having access to the special installation and removal tools and the removal key can accomplish separation of the flanges only by cutting the retaining pin. The retaining pin is composed of stainless steel of a designed hardness, making it extremely difficult to cut by means of a cutting torch or a metal cutting saw. The hardness of the material from which the retaining pin is composed renders it extremely difficult and time consuming to cut by means of a cutting saw.

Seal plugs are also employed to provide seals at the outer portions of one of the locking receptacles and the transverse opening for the plug retaining pin. With the seal plugs in place, the surfaces of the plugs can be machined or filed, primed and painted so that it becomes difficult to detect that a locking pin is in fact in place within the flange. These features, taken in concert, provide a locking mechanism which is simple and efficient to use, is low in cost and provides an effective means for retaining the pipe flanges in positive assembly to prevent unauthorized separation, prevent thefts of materials, protect workers from hazards, etc.

BRIEF DESCRIPTION OF THE DRAWINGS

So that the manner in which the above recited features, advantages and objects of the present invention, as well as others, which will become apparent, are attained and can be understood in detail, a more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings.

DETAILED DESCRIPTION OF PREFERRED EMBODIMENT

Figure 1:
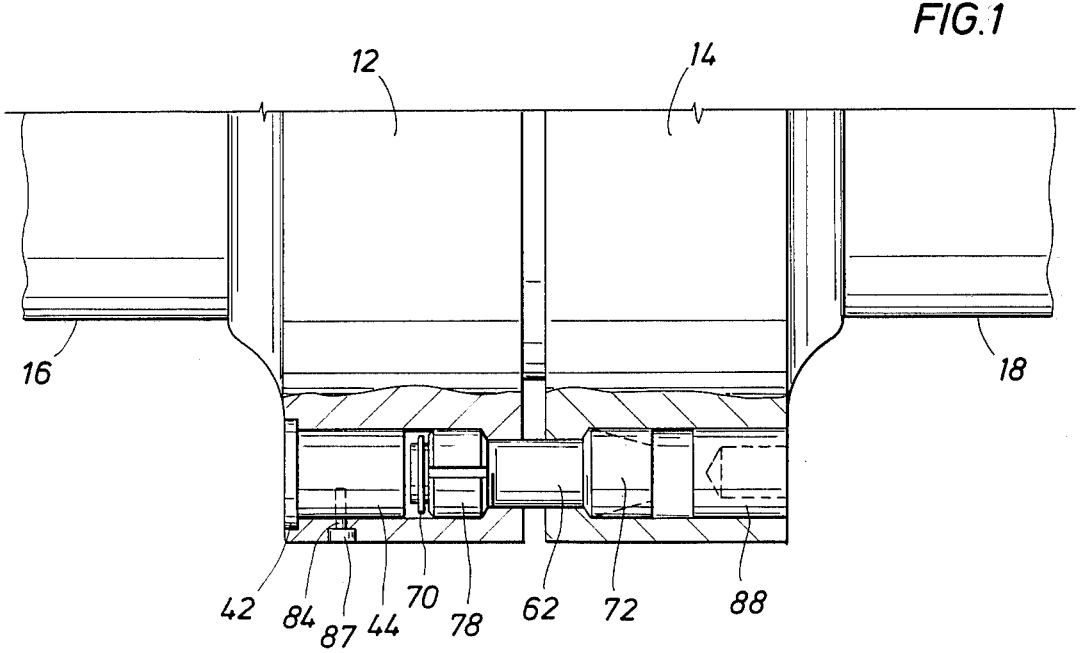
FIG. 1 is a sectional view of a flanged pipe joint constructed in accordance with the present invention and illustrating the locking mechanism of this invention in the assembled condition thereof.
Figure 2:
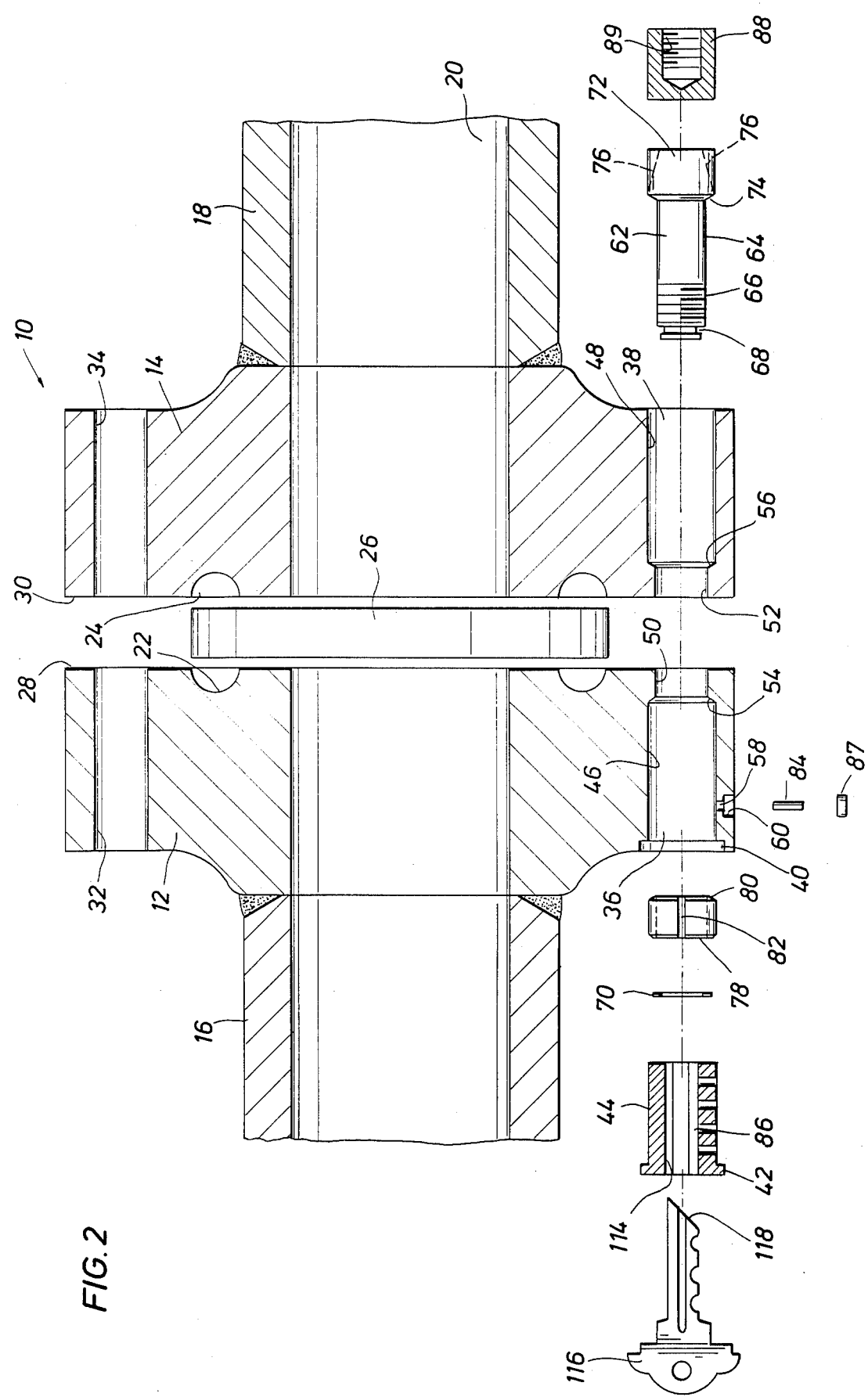
FIG. 2 is an exploded view of the pipe flange structure and locking mechanism of FIG. 1.

Referring now to the drawings and first to FIGS. 1 and 2, a locking type flanged pipe joint is illustrated generally at 10 which incorporates a pair of pipe flanges 12 and 14 which are connected respectively to pipe sections 16 and 18. Openings in the pipe flanges form a flow passage 20 extending through the flanged joint and communicating with the passages of the respective pipe sections 16 and 18. The pipe flanges also define circular ring grooves 22 and 24 which receive a ring gasket in sealed assembly therewith when the flanges 12 and 14 are forced tightly together. With the flanges in tight sealing engagement with the ring gasket, there may be a certain amount of stand-off between the flange faces 28 and 30. Elimination or minimization of flange stand off however will prevent access to the central portions of the retainer pins and prevent persons from sawing them in half.

For retaining the flanges in assembly, the flanges will be formed with a plurality of stud or bolt bores 32 and 34 through which threaded studs or bolts will extend. Nuts will be received by the studs or bolts in the usual manner and tightened to force the flanges 12 and 14 into intimate sealed assembly with the ring gasket 26. The flanges will be provided with a sufficient number of stud or bolt bores to retain the flanges in assembly with the required force to withstand the expanding effects of pressure for which the pipe system is designed.

As mentioned above, it is also desirable to ensure that the pipe flanges 12 and 14 are extremely difficult if not impossible to separate except by authorized personnel using specialized tools, to protect against the release of hazardous materials or theft of fluid products. In accordance with the present invention, one suitable means for accomplishing secured locking of the flanges in assembly may take the form of a locking mechanism which is shown in assembled form in FIG. 1 and shown in exploded form in FIG. 2. Each of the flanges 12 and 14 will be formed to define locking receptacles 36 and 38 which are essentially identical with the exception that locking receptacle 36 forms a circular outer recess 40 which is enabled to receive the outer flange portion 42 of a locking plug 44 in the manner described hereinbelow. Internally, each of the locking receptacles 36 and 38 define generally cylindrical internal surface portions 46 and 48 of large dimension and internal cylindrical surface portions 50 and 52 of smaller diameter as compared to surfaces 46 and 48. These large and small diameter cylindrical surfaces are intersected by means of tapered circular shoulder surfaces 54 and 56. One of the flanges 12 is formed to define a transverse opening 58 having an enlarged outer receptacle portion 60 for retention of a seal plug.

To secure the flanges 12 and 14 in positive assembly, an elongated retaining pin 62 is provided having an elongated shank portion 64 of generally cylindrical form which is provided with external threads 66 at one extremity thereof. The elongated shank 64 is also formed to define a circular locking ring groove 68 which receives a locking ring 70 in the manner described hereinbelow. The retaining pin 62 also defines a circular enlarged head 72 having a tapered circular shoulder 74 which is adapted to seat against the internal tapered shoulder 56 of the flange 14. The head portion 72 of the retaining pin also defines a plurality of tapered slots 76 or slots of other proprietary design which receive mating projections defined on a pin installation tool in the manner described hereinbelow.

After the retaining pin 62 has been installed in place within the locking receptacle 38 the threaded free extremity 66 thereof is positioned within the opposite locking receptacle 36 of the flange 12. An internally threaded retaining sleeve 78 is then threaded onto the threaded portion 66 of the retaining pin to such extent that a tapered shoulder surface portion 80 thereof bears against the internal tapered shoulder 54 of the receptacle 36. The retaining sleeve 78 is formed to define a plurality of external grooves 82 which are adapted to receive driving projections extending from a sleeve installation tool which is also discussed hereinbelow. After the retaining sleeve 78 has been properly threaded onto the retaining pin 62, a locking ring 70 is then installed within the locking ring groove 68 of the retaining pin. The locking ring prevents the retaining sleeve from inadvertently unthreading and further prevents unauthorized personnel from unthreading the retaining sleeve. The locking ring 70 is in the form of a snap ring which snaps into place within the locking groove 68 and which may be removed by means of a snap ring tool of conventional nature.

After the retaining sleeve and locking ring have been installed in position on the retaining pin 62, a significant length of the cylindrical bore 46 will be exposed. The locking plug 44 is then inserted into the outer portion of the receptacle 36 thereby positioning the outer flange 42 thereof within the circular flange receptacle 40. After the plug 44 has been properly installed within the receptacle 36, a plug retainer pin 84 is inserted through the pin opening or passage 58 and is received by one of a plurality of transverse openings 86 defined in the body of the locking plug 44. The pin 84 prevents the locking plug from being extracted from the receptacle 36. A seal plug 87 which may be composed of metal, plastic or any one of a number of suitable materials is received within the outer receptacle portion 60 of the transverse opening 58. The purpose of the seal plug 87 is to retain the plug retainer pin 84 in its proper position to thus restrain the locking plug 44 from inadvertent disassembly from the receptacle 36. After the seal plug 87 has been properly installed, its outer portion may be filed, sanded or otherwise machined to the outer surface configuration of the flange. After it has been primed and painted, it will be difficult for unauthorized personnel to discover its existence and function. Further, the seal plug 87 being composed of a hard material such as steel or hard plastic will be difficult to extract from the outside of the flange, thereby providing good protection against tampering by unauthorized personnel. With the retaining pin 62 in place within the receptacle 38, a second seal plug 88 may be installed in the outer portion of the cylindrical bore 48. The retaining pin seal plug 88 may be formed of any suitable material such as steel, hard plastic, etc., and may be driven into place within the outer portion of the receptacle 38, thus being retained by means of a friction fit. The outer surface portion of the plug 88 may also be filed or machined to the surface configuration of the flange and may be primed and painted. When this is accomplished, the presence and function of the plug 88 will be difficult to detect by unauthorized personnel. If detected, the plug 88 will also be difficult to extract from the outside of the flange. The plug 88 forms an internally threaded opening 89 which is adapted to receive the screw threaded connector portion of an impact hammer, not shown. To remove the plug 88 to thus gain access to the head 72 of pin 62 an impact hammer is threaded into the opening 89. The hammer is then manipulated by impact to extract the plug 88. After the plug 88 has been removed the driving head of tool 90 of FIG. 3 is inserted into the receptacle 38 and into driving interconnection with the grooves 76 of the retaining pin head 72.

Figure 3:
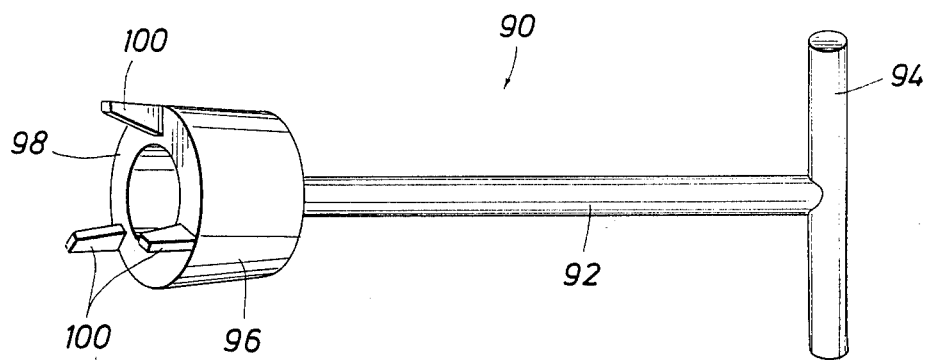
FIG. 3 is an isometric view illustrating the retaining pin installation tool for installation and removal of the retaining pin of the locking mechanism.

Referring now to FIG. 3, a pin installation tool is illustrated generally at 90 which incorporates an elongated tool shank 92 having a transverse drive handle 94 which permits a worker to rotate the tool. A drive head 96 is connected at the opposite end of the shank portion 92 and defines an outer circular portion 98 which provides support for a plurality of tapered drive projections 100. The tapered drive projections are adapted to be received within the tapered grooves 76 of the head portion 72 of the retaining pin. With the drive projections 100 in place within the tapered grooves 76 the retaining pin 62 may be stabilized or rotated as desired for installation and removal. It should be borne in mind that the drive projections may be of any suitable proprietary form, number and relative position so as to provide assurance that the flange unlocking tools of other owners may not be used to unlock the flanges.

Figure 4:
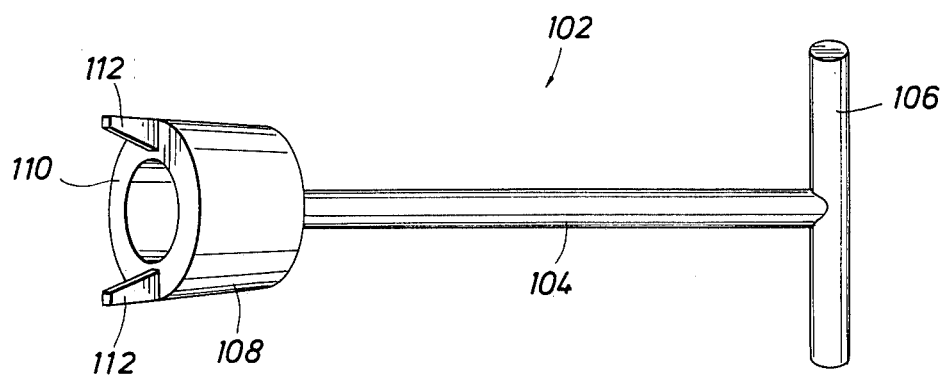
FIG. 4 is an isometric illustration of the sleeve installing tool for installation and removal of the pin retaining sleeve of the locking mechanism.

Referring now to FIG. 4, a retaining sleeve installation tool is illustrated generally at 102 and is also provided with an elongated shank portion 104 and a transverse operating handle 106. A drive head 108 is also connected to the free extremity of the shank 104 and presents an outer circular portion 110 from which extends a plurality of tapered projections 112 which may also be of other proprietary design as desired. The tapered projections 112 are receivable within the slots 82 of the retaining sleeve 78 and thereby function as drive pins which permit rotation of the retaining sleeve to thread it onto the threaded portion 66 of the retaining pin. Both of the installation tools 90 and 102 are employed simultaneously to stabilize the retaining pin while threading the retaining sleeve onto the pin or stabilizing the retaining sleeve while rotating the retaining pin and making up the threaded relation of the pin and sleeve. Without these specifically designed tools, it is impossible to either stabilize or rotate either the retaining pin or the retaining sleeve.

Although the tapered drive projections 100 and 112 of the tools 90 and 102 are shown to be of tapered form, such is not intended to be limiting as regards the spirit and scope of the present invention. The drive projections may be of any suitable form or orientation which permits the installation tools to be utilized only with retaining pins and retaining sleeves of mating design. The owner of the installation tools and flange locking mechanisms will then be ensured that persons having similar installation tools would be incapable of disassembling the flanges.

As a further deterrent to disassembly of the flanges by unauthorized personnel and to permit ease of assembly by authorized personnel, the locking plug 44 is formed to define an internal key way as shown at 114 which is of a specific design to receive a hardened key element 116. The key 116 will also be in possession only by authorized personnel. The key 116 forms a tapered camming surface 118 having the capability of engaging the plug retainer pin 84 as the key is inserted into the key way 114. The key 116 is formed of hardened material and is capable of forcing the plug retainer pin 84 outwardly as the key is fully inserted into the key way. The key develops sufficient force against the retainer pin 84 to drive the seal plug 86 from its receptacle 60, thereby exposing the outer portion of the retainer pin 84 for removal. After the pin 84 has been removed, the locking plug 44 will have been released and may be extracted from the outer portion of the receptacle 36.

After extraction of the plug 44, a locking ring tool may be employed to remove the locking ring 70 from the ring groove 68 of the retaining pin 62. It will then be necessary to remove the plug member 88 which is retained by friction in the outer portion of the receptacle 38. A suitable impact driving tool then may be employed in the manner described above to remove extract the seal plug 88. After the seal plug has been completely displaced from the receptacle 38 the tools 90 and 102 are used to unthread the retaining sleeve from the retaining pin. Any suitable implement may then be inserted through the receptacle 46 to displace the retaining pin thus completing the disassembly procedure. Disassembly at this point is then complete and the pipe flanges 12 and 14 then may be disassembled in the usual manner. Although only a single locking mechanism is shown in FIGS. 1 and 2, it is to be understood that the flanges 12 and 14 may be provided with a plurality of locking devices if such is desired.

While this invention has been described particularly as it relates to a locking mechanism for pipe flanges, such is not intended to limit the spirit and scope thereof. Any adjacent mechanical objects may be locked in assembly in this manner if they are so constructed as to form locking receptacles of the general nature set forth in the drawings.

In view of the foregoing, it is seen that the present invention is one well adapted to attain all of the objects and features hereinabove set forth, together with other features which are inherent from a description of the apparatus itself.

What is claimed is:

1. A security mechanism for retaining mechanical objects in assembly and permitting separation thereof only by authorized personnel, comprising:
   (a) a pair of mechanical objects disposed adjacent one another and being formed to define registering locking receptacles;
   (b) a retaining pin having first security means at one end and being threaded at the opposite end, said retaining pin being positioned in completely enclosed relation within said one of said locking receptacles and having a portion thereof extending from said one of said locking receptacles into the other of said locking receptacles;
   (c) a retaining sleeve being positioned in completely enclosed relation within said other of said locking receptacles and being threadedly received by said retaining pin, said retaining sleeve defining second security means, said first and second security means preventing assembly and disassembly of said retaining pin and retaining sleeve by means of conventional tools; and
   (d) means closing said locking receptacles and permitting access to said retaining pin and retaining sleeve only by authorized persons possessing access tool means of proprietary form enabling removal of said closing means.

2. A security mechanism as recited in claim 1, wherein said first security means comprises:
   an enlarged head formed at said one end of said retaining pin, said enlarged head being receivable within said locking receptacle means and defining actuating groove means.

3. A security mechanism as recited in claim 2, including:
   a pin installation tool defining actuating projection means engageable in driving relation within said actuating groove means, said tool means permitting selective restraint and rotation of said retaining pin within said locking receptacle means.

4. A security mechanism as recited in claim 1, wherein said second security means comprises:
   drive groove means being formed in said retaining sleeve and adapted to receive a sleeve engaging tool of proprietary design.

5. A security mechanism as recited in claim 4, including:
   a sleeve actuating tool having a drive portion defining actuating projection means receivable in mating driving relation with said drive groove means of said retaining sleeve.

6. A security mechanism as recited in claim 1, where said closing and access permitting means comprises:
   (a) a locking plug being received within said other locking receptacle and defining a removable closure therefor;
   (b) means retaining said locking plug within said other locking receptacle; and
   (c) third security means permitting removal of said locking plug from said locking receptacle.

7. A security mechanism as recited in claim 6, wherein said access permitting means comprises:
   (a) locking plug means being removably received within said other of said locking receptacles; and
   (b) plug restraining means securing said locking plug means within said other of said locking receptacles.

8. A security mechanism as recited in claim 7, including:
   closure plug means received by said mechanical objects and preventing access to said retaining pin and plug retraining means.

9. A security mechanism as recited in claim 8, wherein said mechanical objects comprise pipe flanges and:
   (a) one of said pipe flanges forms a pin retainer receptacle disposed in transverse relation to the longitudinal axis of said other locking receptacle; and
   (b) said plug restraining means being a retainer pin positioned within said pin retainer receptacle with a portion thereof establishing restraining engagement with said locking plug means.

10. A security mechanism as recited in claim 9, wherein:
    (a) said pipe flanges define cylindrical internal surfaces forming portions of said locking receptacles;
    (b) one of said pipe flanges forms an outer closure receptacle in registry with said pin retainer receptacle; and
    (c) closure plug means is received in press fitted relation within one of said cylindrical internal surfaces and said outer closure receptacle and prevents access to said retaining pin and plug retaining pin.

11. A security mechanism as recited in claim 9, wherein said third security means comprises:
    (a) a keyway being defined within said locking plug and being accessible through said locking receptacle means, said plug retaining pin having a portion thereof disposed within said keyway; and
    (b) a key element forming said third security means and upon entering said keyway said key element forcing said plug retaining pin from said restraining relation with said locking plug.

12. A security mechanism as recited in claim 1, wherein:

(a) said mechanical objects define internal shoulder means within said locking receptacle means;

(b) said retaining pin means defining an enlarged head having mating shouldered engagement with said internal shoulder means of one of said mechanical objects;

(c) said retaining sleeve having shouldered engagement with said internal shoulder means of the other of said mechanical objects; and (d) said first and second security means being structural irregularities of proprietary design being formed respectively by said enlarged head of said retaining pin and said retaining sleeve.

13. A security mechanism as recited in claim 12, including:

(a) first tool means for assembly and disassembly of said retaining pin, said first tool means defining pin manipulating means of proprietary design establishing mating driving relation with said structural surface irregularities of said enlarged head; and (b) second tool means for assembly and disassembly of said retaining sleeve and defining sleeve manipulating means of proprietary design establishing mating driving relation with said structural surface irregularities of said retaining sleeve.

14. A security mechanism as recited in claim 13, wherein:

(a) said retaining pin defines a locking groove at one extremity thereof; and (b) a locking ring being received within said locking groove and preventing said retaining sleeve from unthreading from said retaining pin.

15. A security mechanism as recited in claim 1, wherein:

(a) said closing and access permitting means defines at least one locking plug received within at least one of said locking receptacles, said locking plug defining a keyway and a first retainer pin receptacle in intersecting relation with said keyway;

(b) at least one of said mechanical objects defining a second retainer, pin receptacle positioned in registering relation with said first retainer pin receptacle of said locking plug;

(c) a plug retainer pin being positioned within said first and second retainer pin receptacles and securing said at least one locking plug within said at least one of said locking receptacles; and (d) key means of proprietary design being capable of entering said keyway and engaging and displacing said plug retainer pin to a position releasing said locking plug for removal from said one of said locking receptacles.

16. A security mechanism for retaining mechanical objects in assembly and permitting separation thereof only by authorized personnel, comprising:

(a) a pair of mechanical objects disposed adjacent one another and being formed to define registering locking receptacles;

(b) a retaining pin having first security means at one end and being threaded at the opposite end, said retaining pin being positioned in completely enclosed relation within said one of said locking receptacles and having a portion thereof extending from said one of said locking receptacles into the other of said locking receptacles;

(c) a retaining sleeve being positioned in completely enclosed relation within said other of said locking receptacles and being threadedly received by said retaining pin, said retaining sleeve defining second security means, said first and second security means preventing assembly and disassembly of said retaining pin and retaining sleeve by means of conventional tools;

(d) at least one locking plug being removably received within at least one of said locking receptacles and forming a keyway;

(e) plug retainer means securing said at least one locking plug within said at least one locking receptacle; and (f) key means being receivable within said keyway and releasing said plug retaining means to permit removal of said at least one locking plug from said at least one locking receptacle.

17. A security mechanism as recited in claim 16, wherein:

(a) said plug retaining means is a pin member intersecting said keyway; and (b) said key means being capable of moving said pin member to a position releasing said locking plug for removal.

* * * * *